Aug. 25, 1953     P. CARTA     2,649,654
SLITTING DEVICE FOR WIRE INSULATION OR THE LIKE
Filed Oct. 26, 1944     2 Sheets—Sheet 1
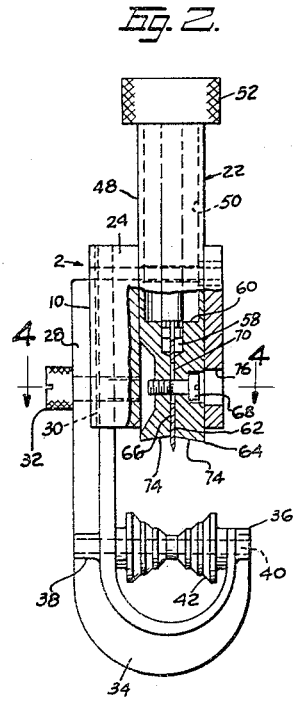
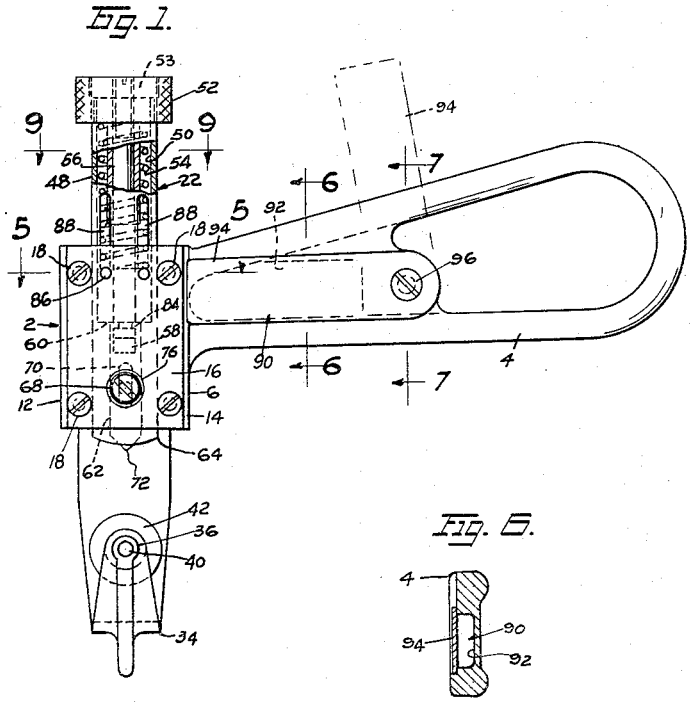
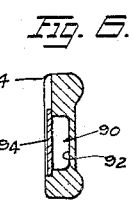
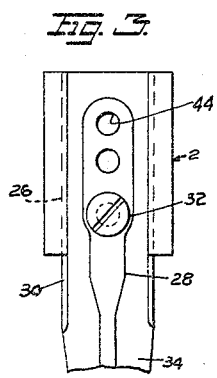
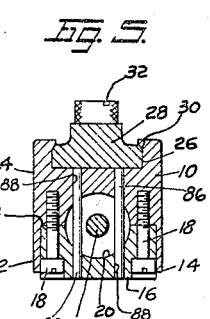
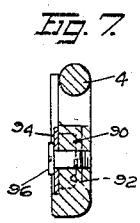
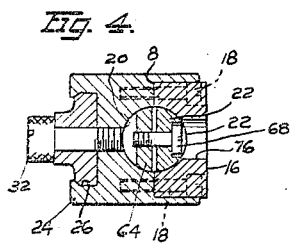
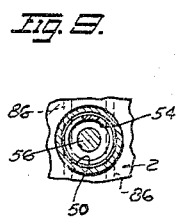
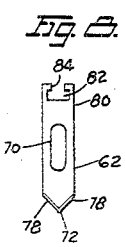
INVENTOR
Pierre Carta Aug. 25, 1953          P. CARTA          2,649,654
SLITTING DEVICE FOR WIRE INSULATION OR THE LIKE
Filed Oct. 26, 1944          2 Sheets-Sheet 2
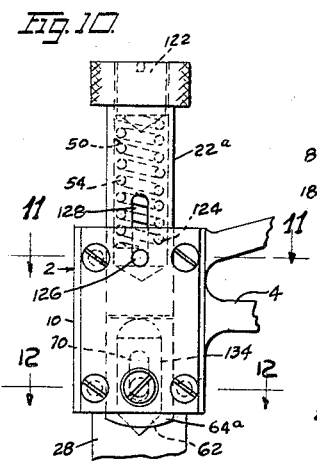
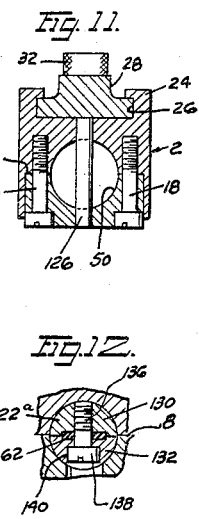
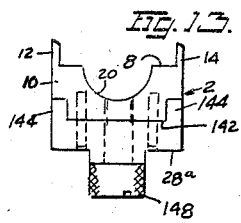
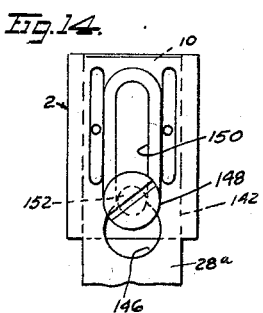
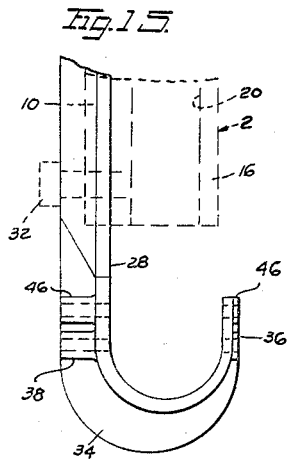
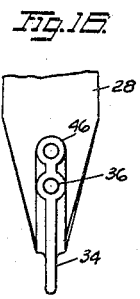
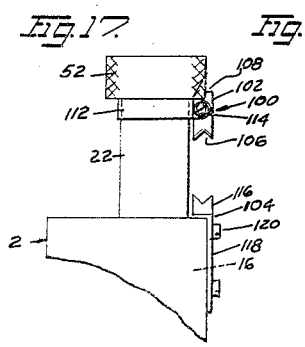
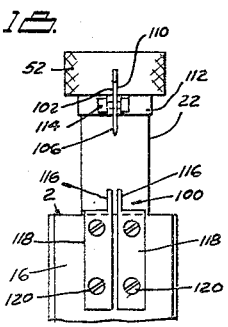
INVENTOR
Pierre Carta

Patented Aug. 25, 1953

2,649,654

UNITED STATES PATENT OFFICE 2,649,654

SLITTING DEVICE FOR WIRE INSULATION OR THE LIKE

Pierre Carta, Los Angeles, Calif., assignor to Anthony Carta, Los Angeles, Calif.

Application October 26, 1944, Serial No. 560,499

3 Claims. (Cl. 30—91)

My invention relates to wire insulation slitting devices and more particularly to those which are especially adaptable for cutting, slitting and for stripping said wire insulation, or the wire covering from wires.

Accordingly an object of my invention is to provide a device, having a knife means and a wire guide means, which is simple in contruction and having suitable means for adjusting said knife means into a suitable slitting position, so that said insulation may be cut without creasing, cutting, scratching or marring the wire surface, and also for stripping said cut insulation therefrom.

Another object of my invention is to provide said device with a suitably adjustable bracket means, which is adapted for holding the wire supporting roller in position so that the wire insulation of different wire diameters may be slitted and stripped.

Further object of my invention is to provide said device with a suitable pocket means adapted for storing therein the slitting knife blades so that the worn out knife may be exchanged for new when required.

Other object of my invention is to provide said device with a detachable wire stripper means, which may be easily attached to the movable members of said device, and which when in use will strip the wire insulation from said wire without a danger of cutting, scratching or marring the wire surface.

Other and further objects and advantages of my invention as will hereinafter more fully appear, I attain by the construction herein shown on the drawings and described in the specification, forming a part of my application.

Reference being had to the accompanying drawings, in which the similar reference characters denote the similar parts.

In the drawings:

Fig. 1 is the side elevational view of the device.

Fig. 2 is the end elevational view of the device, showing the position of the guiding roller.

Fig. 3 is the rear side elevational and partly fragmentary view of the housing section, showing the mounting arrangement of the bracket.

Fig. 4 is the horizontal sectional view of the device, taken on the line 4—4 of the Fig. 2.

Fig. 5 is the horizontal sectional view of the device, taken on the line 5—5 of the Fig. 1.

Fig. 6 is a vertical sectional view of the pocket compartment which is disposed in the handle member of the device, taken on the line 6—6 of the Fig. 1.

Fig. 7 is another vertical sectional view of the device disclosing the handle construction, taken on the line 7—7 of the Fig. 1.

Fig. 8 shows the elevational view of the slitting knife.

Fig. 9 is a horizontal sectional and elevational view of the plunger member of the device, taken on the line 9—9 of the Fig. 1.

Fig. 10 shows a fragmentary and elevational view of the device, showing the plunger member in a modified form.

Fig. 11 is a horizontal sectional view of the device, taken on the line 11—11 of the Fig. 10.

Fig. 12 is a horizontal sectional and partly fragmentary view of the plunger, taken on the line 12—12 of the Fig. 10.

Fig. 13 is a top view of the body member of the device showing the bracket position, and showing the construction in a modified form.

Fig. 14 is an elevational view of the body member having the bracket member in position, and taken from the bottom side of the Fig. 13.

Fig. 15 shows a fragmentary and partly elevational view of the bracket member, showing same in a modified form.

Fig. 16 is the front elevational view of the bracket member, taken from the right of the Fig. 15.

Fig. 17 shows the fragmentary elevational view of the device, showing the position of the insulation stripping attachment.

Fig. 18 shows the front elevational view of the stripping attachment taken from the right of the Fig. 17.

Describing my invention more in detail, said invention comprises a slitter device 2 which is provided with a suitable handle member 4 and a slitter housing 6, said housing being made an integral part of said handle, and thereby providing a rigid and a balanced device when slitting and stripping the insulation from the wire.

Said housing 6 is divided at the line 8. Figs. 4 and 5 at which the housing body member 10 is provided with a pair of side guide members 12 and 14, which extend frontwardly and wherein a cap member 16 is placed.

Said cap member 16 is held in place and is attached to said housing body member 10 by means of a set of screws 18 and, at said divisional line 8 thereof, a suitable hole or a bore 20 is provided wherein the plunger member 22 is slidably positioned, as shown in Figs. 1, 2, 4 and 5.

The rear section 24 of said housing body member 10 is provided with a longitudinal guide 26 wherein a suitable bracket member 28 is placed and which is held in place by means of beveled ridges 30 (Figs. 3 and 5) and wherein it is locked in its position by means of a screw member 32.

Said bracket member 28 extends downwardly and forms a U-member 34, the front end section of which extends upwardly and thus forming a bearing hub 36 which is in line with a rear bearing hub 38 and wherein a pin member 40 is placed upon which a suitable roller member 42 is revolubly mounted, and which is provided with steps in order to accommodate different wire diameters, when in use.

The U-member 34 of said bracket member 28 is of a T-shaped construction in cross section in order to provide strength for the bracket structure when cutting heavy lead insulation of the wire, and in order to increase the usefulness of the device and to handle large wire diameters, said bracket is provided with a set of mounting holes 44, so that said bracket may be adjusted to any suitable or desired position, when required.

Also, as shown in Figs. 15 and 16, said bracket member 28 may be replaceable and having the U-member 34 provided with a set of additional bearing hub holes 46, so that different size of guiding roller member 42 may be mounted therein, and thereby accommodating different wires, in shapes and diameters, during the insulation slitting operation.

Said plunger member 22 is provided with a partial tubular section 48 which is hollowed out as at 50 at the upper section thereof, whereupon a plunger head member 52 is secured in place as shown.

The plunger head member, when in position, is also provided with a suitable plug member 53 which encloses entirely said hollowed out section 50 and which is for holding therein a suitable spring member 54, while at the center thereof a longitudinal adjusting rod member 56 is screwed in place, which may be adjusted to any desired position as required.

Said adjusting rod member extends downwardly into a suitable socket or hole 58 which is positioned below the bottom section of said hollow 50, and the end of said rod member 56 is provided with a suitable groove 60, which groove is adapted for holding the slitting knife 62 in an adjustable position.

The bottom section 64 of said plunger member 22 is provided with a suitable slot 66 wherein said knife 62 is placed, and in order to hold said knife in place, during the slitting operation, a suitable hold-down screw 68 is provided, the shank of which passes through the knife slot 70, Fig. 8, so that when said screw 68 is tightened, it will hold said knife 62 firmly in place.

It may be noted, that by adjusting said rod member 56 by means of a screw driver, engaging a slot at the top end thereof, then the cutting edge 72 of said knife 62 may be accordingly adjusted to suit, and then, to guide the wire into the center and to prevent said wire from slipping sidewardly out of line, the end section of said plunger member 22 is provided with a set of angular surfaces 74, as shown in Fig. 2, and thereby guiding said wire into central position, supported by means of said roller member 42.

Then for fastening said knife 62 in an adjusted position, said cap member 16 is provided with a suitable hole or passage 76 (Figs. 2 and 4) wherethrough the head of the screw 68 may be reached by means of a screw driver or the like.

Said knife 62 may be made in various thicknesses or widths, as in practice may be most desirable, however, as shown in Fig. 8, said knife is provided with two sharp inclined edges 78 extending to a point 72 thus forming a two edged blade which may be reversed when required, also, said knife is provided with a suitable slot 70 in the center section thereof, while the top end section 80 is provided with an opening 82 having a pair of lip members 84 adapted for engaging said groove 60 of said rod member 56.

In order to hold said plunger member 22 in proper relation so that the cutting knife edge 72 may be held in a slitting position over the wire when disposed upon and guided by said roller 42, said plunger member 22 is provided with a pair of cross rods 86 (Figs. 1 and 5) which are mounted within said housing body member 10 and said cap member 16 and thereby in passing through the slots 88 in said plunger member 22 the position thereof is maintained, and in addition said pins or rods 86 provide means for supporting the spring member 54 in position which permits said plunger member 22 to be depressed downwardly and in this manner causing said knife edge 72 to cut and slit the insulation from the wire, when the device is in use. The spring returns the blade to the retracted position.

When in operation, a wire covered with insulation, or a cable wire covered with lead covering, is placed upon said roller member 42, and then said plunger head member 52 is depressed downwardly, causing said spring member 54 to become compressed, which causes the cutting edge 72 of said slitting knife 62 to bear against the insulation, thus cutting a slit therein when said wire or cable is pulled in a lengthwise direction, and then when said plunger head member is released, said spring 54 bearing against and urging said plug member 53 upwardly will cause the plunger member 22 together with said knife 62 to return to a retracted position.

Then to maintain a supply of said knives 62 on hand, in order to exchange the worn out ones when required, a suitable pocket member 90 is provided in said handle member 4, said pocket forming a cavity 92 (Figs. 6 and 7) which is enclosed by means of a suitable cover member 94, one end of which is pivoted upon a pivot pin member 96 so that it may be used for housing said knife blades therein, when required.

When it is desirable or required to strip the slitted insulation from the wire, then a suitable stripping device 100 is used, as shown in Figs. 17 and 18, which comprises a movable V-notched stripper blade 102 mounted upon the plunger member 22 and a suitable companion stripper member 104 which is mounted upon the cap member 16.

Said stripper blade 102 comprises cutting edges 106 along the V-notch of the blade which extends downwardly, while the upper end 108 of said stripper blade is disposed within a slot 110. The stripper blade 102 is held in place by means of a band 112 and fastened in position by means of a screw member 114, thus preventing said cutting edge 106 from shifting sidewardly.

The companion stripper member 104 comprises a pair of V-notched knives 116, each of which extends out of a bracket member 118 and which are mounted upon the face of said cap member 16 and held in position by means of screws 120, thus allowing said stripper blade 102 to be forced between said pair of knives 116 when stripping said insulation from wire.

In Figs. 10, 11 and 12, is shown a modification of the invention, which comprises a plunger member 22a provided with said hollowed out section 50 wherein said spring member 54 is positioned.

Said hollowed out section 50 is enclosed by means of a plug member 122 which holds said spring member 54 in any adjusted position, while its lower end 124 is supported by means of an anchor pin 126, which pin is adapted to slide along the groove 128 and thereby providing means for guiding said plunger member 22 when same is depressed downwardly.

The bottom section 64a of said plunger member 22a comprises two halves forming sections 130 and 132, of which said half section 130 is an extension and an integral part of said plunger member 22a.

Said half section 130 is also provided with a longitudinal groove 134 adapted for receiving therein said slitting knife 62, and is also provided with a threaded hole 136 adapted for receiving therein the threaded shank of the screw 138.

The other half section 132, may, if so desired, be also provided with a knife groove for holding said knife 62 in its place and is principally provided with a counter-bore 140 for receiving therein the head section of said screw 138, so that when said half sections 130 and 132 are fastened together, said knife member 62 will be held in place during the insulation slitting operation, while the adjustment of said knife 62 is permitted by utilizing the slot 70, thus permitting said knife to be raised or lowered as required.

In the Figs. 13 and 14, which is also the modification of the invention, the bracket member 28a is provided with a longitudinal square shaped groove 142, having a pair of side extensions 144, adapted for straddling the sides of said housing member 10.

Said bracket member 28a is also provided with a passage 146 adapted for receiving therein the screw head member 148, which passage is milled into a longitudinal slot 150 for permitting the shank 152 of said screw 148 to slide therein, and thereby providing an adjustment for said bracket member 28a, as in practice may be most desirable.

While I have thus described my invention with great particularity, it will be clear that the same may be modified throughout a wide range.

I accordingly do not propose to be limited to the exact details of construction herein shown on the drawings and described in the specification, but reserve the rights in practice to make the necessary changes and modifications therein, which may come within the scope of the appended claims.

I claim as my invention:

1. A slitter device of the class described, comprising, a housing, a handle extending from said housing, a detachable bracket mounted upon the rear section of said housing extending downwardly and terminating with a U-member, a wire guiding roller revolubly mounted in said U-member of said bracket for holding and for guiding the insulated wire into position, a plunger slidably mounted in said housing, a slitter knife extending from the bottom section of said plunger having inclined cutting edges and terminating with a cutting point for slitting insulation on said wire when disposed upon said wire guiding roller, a pair of cross rods mounted in said housing and passing through said plunger for guiding said plunger with said slitting knife into insulation slitting position, a head member upon the upwardly extended end of said plunger, a spring in said plunger resting upon said cross rods for maintaining said spring in a straight position and for preventing said spring from binding therein, adjustable plug in said head member for adjusting the pressure of said spring in said plunger, and adjusting rod in said plug extending through said plunger and connecting said slitting knife for adjusting the cutting position of said knife point.

2. A slitter device of the class described, as disclosed in claim 1, wherein, a hold down screw is provided in said plunger for securing said slitting knife in position, whereby the cutting position of said knife point may be maintained.

3. A slitter device of the class described, as disclosed in claim 1, wherein, a groove is provided in said adjustable rod disposed upon the lowermost end thereof, an opening in said slitting knife disposed upon the top section thereof, and a pair of lip members in said top section of said knife for engaging said groove of said adjustable rod, whereby the position of said knife cutting point may be adjusted into extended or retracted position.

PIERRE CARTA.

References Cited in the file of this patent

UNITED STATES PATENTS

| Number | Name | Date |
|---|---|---|
| 608,919 | Sell | Aug. 9, 1898 |
| 964,561 | Salviola | July 19, 1910 |
| 2,089,528 | Barycz | Aug. 10, 1937 |
| 2,300,087 | Anello | Oct. 27, 1942 |